US010356441B2

United States Patent
Pettersson et al.

(10) Patent No.: US 10,356,441 B2
(45) Date of Patent: *Jul. 16, 2019

(54) METHOD AND APPARATUS FOR DETECTING QUALITY DEFECTS IN A VIDEO BITSTREAM

(71) Applicants: TELEFONAKTIEBOLAGET LM ERICSSON (PUBL), Stockholm (SE); Deutsche Telekom AG, Bonn (DE)

(72) Inventors: Martin Pettersson, Vallentuna (SE); Savvas Argyropoulos, Bonn (DE)

(73) Assignees: TELEFONAKTIEBOLAGET LM ERICSSON (PUBL), Stockholm (SE); DEUTSCHE TELEKOM AG, Bonn (DE)

(*) Notice: Subject to any disclaimer, the term of this patent is extended or adjusted under 35 U.S.C. 154(b) by 57 days.

This patent is subject to a terminal disclaimer.

(21) Appl. No.: 15/609,290

(22) Filed: May 31, 2017

(65) Prior Publication Data

US 2018/0020242 A1    Jan. 18, 2018

Related U.S. Application Data

(63) Continuation of application No. 14/363,607, filed as application No. PCT/EP2011/072288 on Dec. 9, 2011, now Pat. No. 9,686,515.

(51) Int. Cl.
    *H04N 19/85*      (2014.01)
    *H04N 19/89*      (2014.01)
    (Continued)

(52) U.S. Cl.
    CPC .......... *H04N 19/85* (2014.11); *H04N 17/004* (2013.01); *H04N 19/89* (2014.11); *H04N 21/44008* (2013.01)

(58) Field of Classification Search
    USPC ................................................. 386/263–277
    See application file for complete search history.

(56) References Cited

U.S. PATENT DOCUMENTS

| | | | |
|---|---|---|---|
| 7,092,448 B2 | 8/2006 | Turaga et al. | |
| 7,869,517 B2 | 1/2011 | Ghanbari | |

(Continued)

FOREIGN PATENT DOCUMENTS

| | | | |
|---|---|---|---|
| CN | 1656823 A | 8/2005 | |
| CN | 101978700 A | 2/2011 | |

(Continued)

OTHER PUBLICATIONS

Ou et al. "Modeling the Impact of Frame Rate and Quantization Stepsizes and Their Temporal Variations on Perceptual Video Quality: A Review of Recent Works", IEEE, 2010, 6 pages.

(Continued)

*Primary Examiner* — Hung Q Dang
(74) *Attorney, Agent, or Firm* — Rothwell, Figg, Ernst & Manbeck, p.c.

(57) ABSTRACT

There is provided an apparatus for detecting a quality defect in a video sequence, the apparatus comprising: a receiver arranged to receive a video bitstream representing a video sequence; and a defect module arranged to determine a measure of quantization parameter for each picture of the video sequence, the defect module further arranged to identify a quality defect when an abrupt change in the measure of quantization parameter occurs.

27 Claims, 5 Drawing Sheets

(51) Int. Cl.
*H04N 21/44* (2011.01)
*H04N 17/00* (2006.01)

(56) References Cited

U.S. PATENT DOCUMENTS

| | | | |
|---|---|---|---|
| 2002/0071492 | A1 | 6/2002 | Ramanzin |
| 2002/0126258 | A1 | 9/2002 | Honda |
| 2003/0219070 | A1 | 11/2003 | Turaga et al. |
| 2007/0201752 | A1 | 8/2007 | Gormish |
| 2008/0304562 | A1 | 12/2008 | Chang et al. |
| 2010/0027621 | A1 | 2/2010 | Yano |
| 2010/0315557 | A1 | 12/2010 | Mathew et al. |
| 2011/0013694 | A1 | 1/2011 | Watanabe et al. |
| 2011/0052084 | A1 | 3/2011 | Yang et al. |
| 2011/0216828 | A1* | 9/2011 | Yang .................. H04N 7/0132 375/240.12 |
| 2011/0228859 | A1 | 9/2011 | Sugimoto et al. |

FOREIGN PATENT DOCUMENTS

| | | |
|---|---|---|
| EP | 2252073 A1 | 11/2010 |
| EP | 2373049 A1 | 10/2011 |
| JP | 2002325254 A | 11/2002 |
| JP | 2006509435 A | 3/2006 |
| JP | 2009260940 A | 11/2009 |
| JP | 2010011112 A | 1/2010 |
| JP | 2011199380 A | 10/2011 |
| KR | 10-2010-0126397 A | 12/2010 |
| WO | 2004054274 A1 | 6/2004 |
| WO | 2010056310 A1 | 5/2010 |

OTHER PUBLICATIONS

Yim et al. "Evaluation of temporal variation of video quality in packet loss networks" Signal Processing: Image Communications, 2011, 26:24-38.
KIPO's Notice of Preliminary Rejection dated May 27, 2015, in connection with Korean Patent Application No. 10-2014-7015004, 5 pages.
Notification of Reasons for Rejection dated Nov. 24, 2015, issued in Japanese Patent Application No. 2014-545112, 10 pages.
Chinese Search Report dated Sep. 24, 2015, in Chinese Application No. 201180075398, 4 pages.
Chinese Search report, issued in Chinese Application No. 201180075398.X and dated Sep. 19, 2016, 4 pages including translation.
International Search Report and Written Opinion issued in Application No. PCT/EP2011/072288 dated May 29, 2012, 9 pages.
The extended European Search Report issued in Application No. 18193687.3 dated Oct. 12, 2018, 6 pages.

\* cited by examiner

METHOD AND APPARATUS FOR DETECTING QUALITY DEFECTS IN A VIDEO BITSTREAM

CROSS-REFERENCE TO RELATED APPLICATIONS

This application is a continuation of Ser. No. 14/363,607 (status pending), which is a 35 U.S.C. § 371 National Stage Application of International Patent Application No. PCT/EP2011/072288, filed Dec. 9, 2011, designating the United States. The above identified applications are incorporated by reference.

TECHNICAL FIELD

The present application relates to a method for detecting a quality defect in a video sequence; an apparatus for detecting a quality defect in a video sequence; and a computer-readable medium.

BACKGROUND

Block-based coding is the dominant video encoding technology with codec standards such as H.263, MPEG-4 Visual, MPEG-4 AVC (a.k.a. H.264) and the emerging HEVC/H.265 standard being developed in JCT-VC. These codecs use different types of pictures (which employ different types of prediction) to compress the video as efficiently as possible. An intra-coded picture (I-picture) may only be predicted spatially from areas within the picture itself. A predictive picture (P-picture) is predicted from previously coded I or P pictures. A bidirectional predictive pictures (B-picture) is predicted from both previous and/or subsequent pictures.

The result of predicting a particular picture from other pictures is likely to produce a result which is different to the original version of the particular picture. The differences between the prediction of a picture and the original picture are called the picture's residual data. The residual data is transmitted or stored together with the prediction instructions in order to allow the original picture to be accurately reconstructed. In order to make the residual data more compact the data is transformed into the frequency domain. In H.264/AVC the Hadamard transform and a transform similar to a Discrete Cosine Transform are used on 4×4 or 2×2 (chroma) blocks for this purpose. Once the residuals have been transformed a quantization is performed on the transformed data to limit the data that needs to be transmitted or stored. It is in this step that the actual lossy compression takes place. The level of quantization is determined by the quantization parameter (QP) and a corresponding look-up-table. The QP is set at picture level but can also be altered at macro-block (MB) level.

A higher QP means that the residual data are more coarsely quantized, so less detail of the residual data is captured and so the reconstructed picture will match the original picture less well. A lower QP means that more detail of the residual data is captured and so the reconstructed picture will match the original picture well.

It is fairly expensive in terms of bits for an encoder to alter the QP at MB level and so the majority of changes in QP occur between pictures. When the quantization has been performed the quantized transformed residuals are encoded using entropy coding. In H.264/AVC one of the entropy coding algorithms, namely CAVLC (Context Adaptive Variable Length Coding) or CABAC (Context Adaptive Binary Arithmetic Coding), is used for this.

To increase error resilience in error prone networks I-pictures are usually inserted periodically to refresh the video. I-pictures are also inserted periodically to allow for random access and channel switching. Where the forced intra pictures should be inserted in time is not defined by the video coding standard, but is up to the encoder to decide. Typically, video coding standards define the video bitstream syntax and the decoding process, but do not define the encoding process. In other words, the method by which the video sequence is encoded is not standardized, whereas the output of the encoding process is standardized.

To ensure the end-to-end quality of video over fixed and mobile networks network operators and broadcast vendors can utilize objective video quality models. Objective video quality models are mathematical models that approximate results of subjective quality assessment, but are based on criteria and metrics that can be measured objectively and automatically evaluated by a computer program.

The performance of an objective video quality model is evaluated by computing a metric between the objective score generated by the objective video quality model and subjective test results. This metric can be, for example, the correlation between subjective and objective data or the mean squared error. A subjective test result may comprise a mean opinion score (MOS) obtained from the opinions of a plurality of human test subjects.

Perceptual models may be considered to be a subset of objective video quality models. Whereas an objective video quality model can refer to any automated quality assessment method, a perceptual model attempts to determine to what extent any quality defects would be perceived by a viewer. Perceptual models can utilize the pixel information in the decoded video sequence, and in the case of full-reference models the reference signal may also be used to predict the degradation of the processed video. A big disadvantage of perceptual models is that they are usually computational demanding and not very suitable for deployment on a large scale for network monitoring purposes.

An alternative approach to perceptual quality models that is more light-weight than a full-reference model is to use network layer protocol headers as input for quality estimation of a transmitted video. This approach makes the model very efficient to implement and use, but the quality estimation of the transmitted video will be rather coarse. Therefore a video bitstream quality model may also be implemented. This model takes the encoded elementary stream as input in addition to network protocol headers and has the advantage that it will be fairly light-weight and yet has the potential of getting a better estimate of the quality of the video than one just using network layer protocol headers. Such a video bitstream quality model may operate in two modes, one mode where full decoding of the bitstream is allowed and another, lower complexity, mode where full decoding is not allowed (such that pixel information cannot be used).

"Modeling the impact of frame rate and quantization stepsizes and their temporal variations on perceptual video quality: a review of recent works" by Y-F. Qu, Z. Ma, and Y. Wang, and published in Conference on Information Sciences and Systems (CISS), 2010 44th Annual Conference, 17-19 Mar. 2010, describes the effect of frame rate and quantization stepsize as well as the temporal variation of the frame rate on the perceptual quality.

"Evaluation of temporal variation of video quality in packet loss networks" by C. Yim and A. Bovik, and published in Signal Processing: Image Communication 26

(2011) describes the effect that variations in the temporal quality of videos have on global video quality.

There is thus a need for quality defect detection that does not require decoding of the encoded video bitstream. Such a quality defect detection may be suitable for implementation with a quality model.

SUMMARY

It has been recognized that abrupt changes in the Quantization Parameter (QP) of a block-coded video stream can give rise to notable quality defects in a decoded video sequence. A method and apparatus for detecting such defects is described which does not require the decoding of the encoded video sequence from the video bitstream. The estimation of the visual impact of the change in QP can be used in conjunction with other model parameters in a video bitstream quality model to estimate the overall quality of a video bitstream. The solution described herein thus improves the accuracy of the estimation. This allows an improved video bitstream quality model without the computational overhead of decoding the video sequence from the video bitstream.

Accordingly, there is provided a method for detecting a quality defect in a video sequence. The method comprises receiving a video bitstream representing a video sequence. The method further comprises determining a measure of quantization parameter for each picture of the video sequence. The method further comprises identifying a quality defect when an abrupt change in quantization parameter occurs.

Certain quality defects can be identified in a video bitstream representing a video sequence without decoding the video sequence from the video bitstream. This means quality defects can be identified in the video bitstream at network locations without a decoder, which allows for more accurate quality estimation at nodes throughout the distribution network.

The method may further comprise determining if each picture of the video sequence is an intra-coded picture, and identifying a quality defect as intra-picture flicker when an abrupt change in quantization parameter occurs for an intra-coded picture.

Intra-picture flicker is one type of quality defect that is caused by an abrupt change in quantization parameter. Intra-picture flicker may be identified when an intra-coded picture coincides with a peak in quantization parameter. Intra-picture flicker may be identified when an abrupt change in quantization parameter occurs between an intra-coded picture and its neighbouring inter-coded pictures.

The method may be used in a quality estimation model to determine a perceptual quality of the video sequence represented by the video bitstream.

There is further provided an apparatus for detecting a quality defect in a video sequence, the apparatus comprising a receiver and a defect module. The receiver is arranged to receive a video bitstream representing a video sequence. The defect module is arranged to determine a measure of quantization parameter for each picture of the video sequence, and is further arranged to identify a quality defect when an abrupt change in the measure of quantization parameter occurs.

The apparatus may further comprise a picture type determining module arranged to determining whether each picture of the video sequence is an intra-coded picture. The defect module may be further arranged to identify a quality defect as an intra-picture flicker when an abrupt change in the measure of quantization parameter occurs for an intra-coded picture.

The apparatus may further comprise a quality module arranged to receive the video bitstream and a defect indication from the defect module, the quality module further arranged to apply a quality model to estimate a quality of video reconstructed from the video bitstream.

There is further provided a computer-readable medium, carrying instructions, which, when executed by computer logic, causes said computer logic to carry out any of the methods defined herein.

BRIEF DESCRIPTION OF THE DRAWINGS

A method and apparatus for detecting a quality defect in a video bitstream will now be described, by way of example only, with reference to the accompanying drawings, in which.

DETAILED DESCRIPTION

One example of a quality defect caused by an abrupt change in quantization parameter (QP) creating a perceptible quality defect is intra-picture flicker. Intra-picture flicker is a coding artifact that is usually due to the bit rate control of the encoder not being able to keep its requirements of having an almost constant quality given a certain bitrate. Bit rate control in video coding is a complex task and is not a part of any standard. It is up to the developer of the encoder to create a rate control that allocates the available bit budget optimally over the pictures of the sequence to maximize the perceived quality. Rate control requirements can be very different. Rate controls for video-calling are often strict to keep the delay of the video low. This sometimes means keeping to a certain bit budget for each picture. One-way video, like broadcasted mobile TV, usually has more relaxed bit rate control requirements with a bit budget for a certain time period, e.g. 1-2 seconds. More flexibility in the rate of encoded video can be provided by implementing statistical multiplexing and distributing a fixed amount of bandwidth across a plurality of parallel video sequences in response to the encoding demands of each sequence. In some encoding arrangements the encoder does not have access to the subsequent pictures and it must select the encoding parameters on-the-fly (which is also known as one-pass encoding). For these and other reasons, during encoding the bitrate may not be optimally allocated between the pictures of the video sequence.

Intra-picture flicker arises when periodic intra-pictures are used when encoding a scene. The artifact is mainly visible at medium to low bitrates, where the requirements of the rate control can be more difficult to meet. However, the artifact may also be visible even if high bitrates are used. Intra-picture flicker is also more apparent for static scenes and where the inter (P- and B-) pictures are relatively inexpensive to encode in terms of bits (but the intra-pictures still are expensive) and the artifact is not masked by motion within the scene.

Figure 1A:
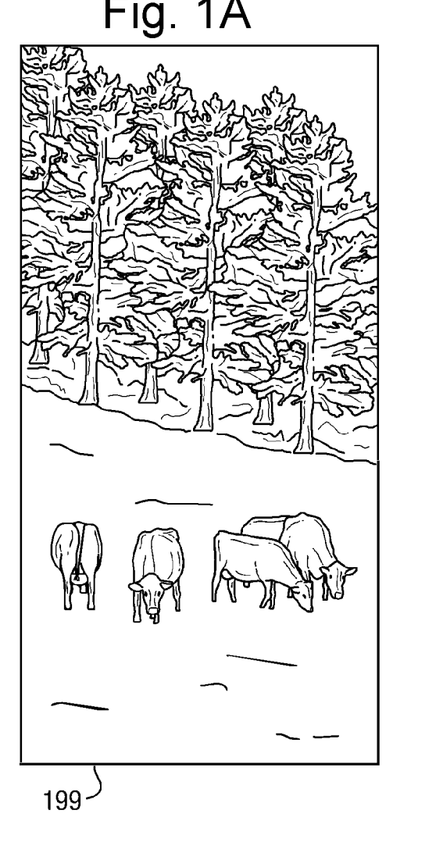
FIGS. 1A, 1B, and 1C each show a sample picture from one scene within a video sequence.
Figure 1B:
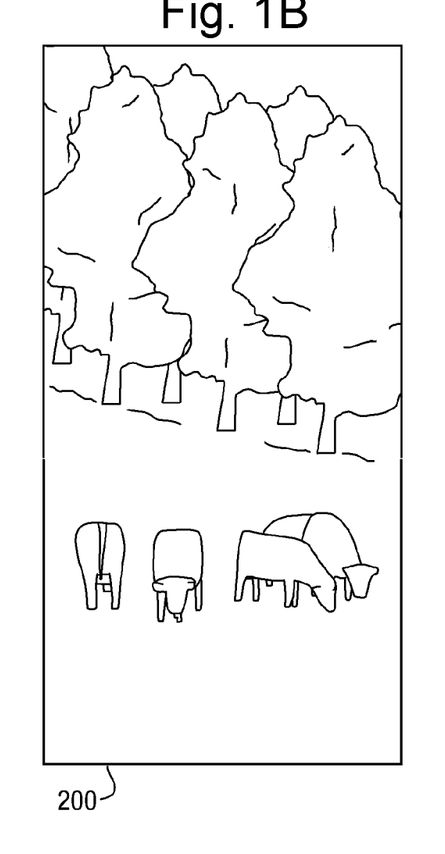
Figure 1C:
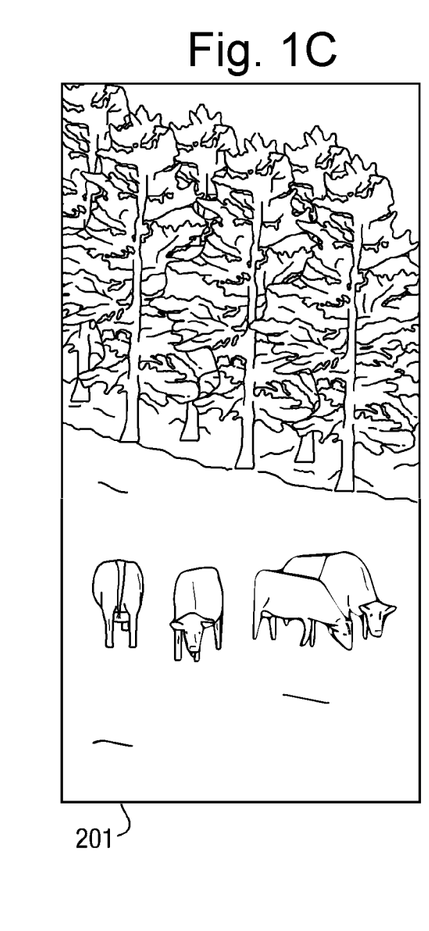

A typical intra-picture flicker artifact is illustrated by FIG. 1. FIG. 1 shows magnified sections of three pictures from one scene within a video sequence, A. FIG. 1A is a portion of picture 199 of sequence A, this picture is an inter-coded picture encoded with an average QP of 26. FIG. 1B is a portion of picture 200 of sequence A, this picture is an intra-coded picture encoded with an average QP of 36. FIG. 1C is a portion of picture 201 of sequence A, this picture is an inter-coded picture encoded with an average QP of 28. The higher QP in picture 200 of the video sequence is apparent from the blurriness of this picture compared to the other two pictures.

The content of video sequence A is of a relatively static nature and depicts grazing cattle. The sequence has been encoded and decoded using JM, which is the reference encoder for H.264/AVC. The pictures 199 and 201 have been encoded as inter-pictures with a relatively low QP. The middle picture 200 has been encoded as an intra-picture with a relatively high QP due to the restrictions of the rate control and the fact that intra-pictures are much more expensive to encode than inter-pictures. Looking at the pictures played out in a sequence will show an obvious and annoying flicker, where the spatial detail within the image disappears at picture 200, but then re-appears at picture 201.

Such intra-picture flicker can be seen in video bitstreams from a variety of encoders. It is not a part of the encoder bit-rate control strategy, but rather a failure to follow the strategy. Since video codec standards do not cover the behaviour of the encoder, but rather the syntax of the bitstream to be decoded by the decoder, there are many different encoding solutions out there. Some encoding solutions manage the intra-picture flickering problem better than others.

Detecting such a defect is particularly important when statistical multiplexing is used and an easy-to-encode channel does not get enough bits to handle the periodic intra-frames correctly. One could also expect the problem to look worse at lower resolutions (e.g. the mobile TV case), when the available bitrate is less, and the encoding complexity per frame has less variation. For instance, having a periodic intra period of 0.5 seconds at a "medium" bitrate for HDTV is usually ok, while using a periodic intra period of 0.5 seconds at a "medium" bitrate for mobile TV (e.g. 320×240 pixels) would very likely result in regular intra-picture flickering.

Presented herein is a method and apparatus for detecting when this quality dip appears by monitoring the QP value. If the QP value is increased by a certain amount between an inter-picture and a following intra-picture and decreased a certain amount for the next-coming inter picture, then an intra-picture flicker is detected. In a preferred embodiment the QP is averaged over each picture before the comparison is made. In another embodiment, the QP difference is calculated per macro block and then the difference is averaged over all macroblocks.

Figure 2:
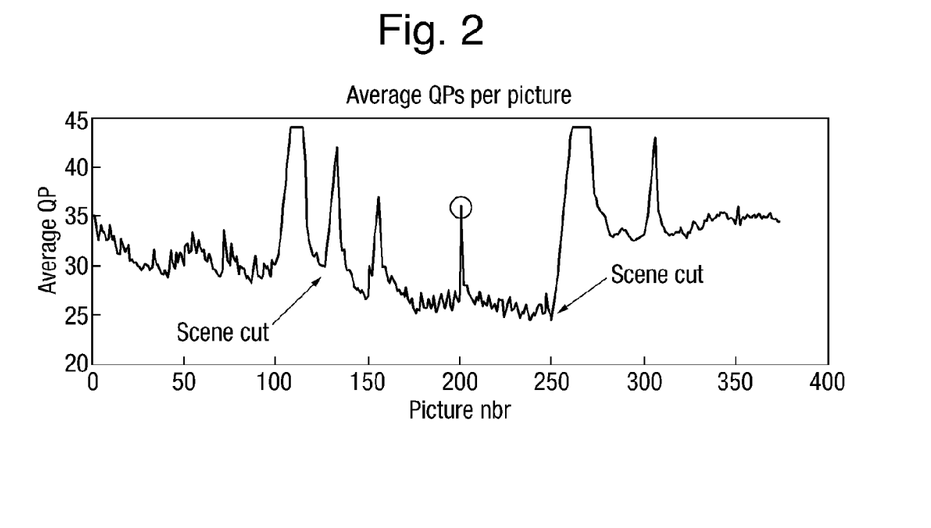
FIG. 2 shows a plot of the average QP per picture for the video sequence of FIG. 1.

FIG. 2 shows a plot of the average QP per picture for sequence A. An intra-picture flicker is present at picture number 200. The peak in QP which gives rise to the intra-picture flicker is marked with a circle on the plot. The sequence contains two scene cuts, marked by arrows, at picture numbers 130 and 250. Despite the fact that the QP is increased a lot when a scene cut occurs this is not annoying to the user and so is not interpreted as an obvious quality defect. This is because the scene is changed and the quality difference between pictures from the old scene and the new scene will not be as apparent to the viewer. Still, the case where the encoded picture quality suddenly drops (either after a scene cut or in the middle of a scene) can be identified by detecting when the QP is increased between an inter-picture and an intra-picture without decreasing considerably after that.

The plot of FIG. 2 also shows a few more peaks at positions ~110, ~155 and ~305. Since the QP is increasing over a few inter-pictures here this is hardly visible to a viewer. Inter-pictures are predicted from previous pictures and so a decrease in fidelity of the residuals for a few pictures will not do much to the apparent quality (while the spatial detail may not be accurate, an appropriate amount of spatial detail is expected to be imported from the referred to pictures). The pseudo code below shows how intra-picture flicker and corresponding sudden drops in encoding quality can be detected:

```
if (pic_n == inter and pic_{n+1} == intra and QP_{n+1} - QP_n > threshold t_1){
    if (pic_{n+1} == scene_cut)
        drop in encoding quality in new scene detected
    else if (QP_{n+1} - QP_{n+2} > threshold t_2) {
        intra picture flicker detected
    }
    else {
        drop in encoding quality detected
    }
}
```

Figure 3:
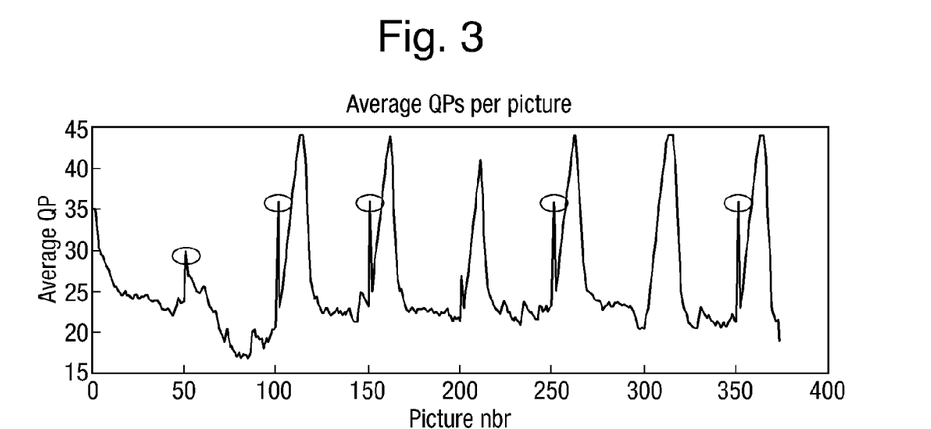
FIG. 3 shows a plot of the average QP per picture for a second video sequence.

FIG. 3 shows a plot of the average QP per picture for a second video sequence, B. This sequence depicts a news-reader where mostly just his lips are moving. Every 50$^{th}$ picture is encoded as an intra-coded picture. Since the scene is very static, the inter-predictions become relatively accurate with a low amount of residual data and a relatively low QP can be afforded for the inter-pictures. The encoder can thus encode the inter-pictures using a relatively low bit rate. However, when a periodic intra-picture is forced into the encoding process, it is much more expensive to encode in terms of bits and the QP must be raised drastically to accommodate it without causing a sharp spike in bitrate demand. Furthermore, inserting the periodic intra-pictures also sets the rate control in imbalance resulting in an increase in QP for the inter-pictures following after a periodic intra picture. Five large intra picture flickers are found in this sequence and are marked with circles in the plot of FIG. 3.

The high QP peaks a few pictures after the periodic intra pictures do not affect quality that much for the same reason described for sequence A: inter-pictures are predicted from previous (good quality) pictures and a decrease in fidelity of the residuals will not do much to the perceived quality over a few inter-pictures.

The range in QP over a sequence also affects the distribution of the quality of a sequence. The span in quality can be calculated as:

$$QP_{range} = QP_{max} - QP_{min}$$

Intra-picture flicker is just one example of an abrupt change in QP causing a quality defect in an encoded video sequence. FIGS. 4A-4D illustrate four types of abrupt change in QP: a peak in FIG. 4A, a trough in FIG. 4B, a step up in FIG. 4C, and a step down in FIG. 4D. A peak is equivalent to a step up immediately followed by a step down, and a trough is equivalent to a step down immediately followed by a step up.

Intra-picture flicker as described above occurs when a peak as shown in FIG. 4A coincides with an intra-coded picture. Such a peak is likely to coincide with an intra-coded picture for the reasons given above, but such a peak could occur coincident with an inter-coded picture, and if it did it is likely that the sharp decrease in spatial detail of the scene would be apparent to the viewer.

Figure 4A:
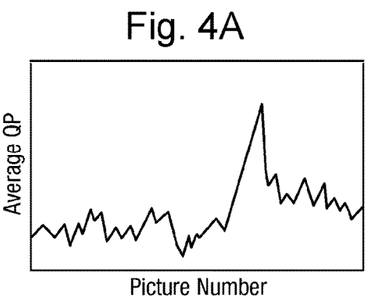
FIGS. 4A, 4B, 4C, and 4D illustrate four types of abrupt change in QP.
Figure 4B:
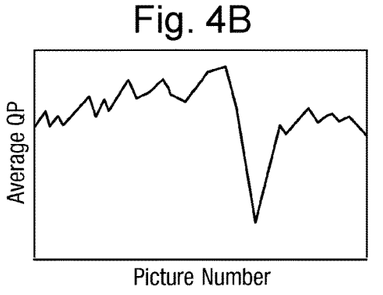

A trough as shown in FIG. 4B will be apparent to a viewer as a sudden increase in spatial detail within a scene, which could be as jarring to the viewer as an intra-picture flicker. Such a trough would be apparent whether or not it coincided with an intra-picture.

Figure 4C:
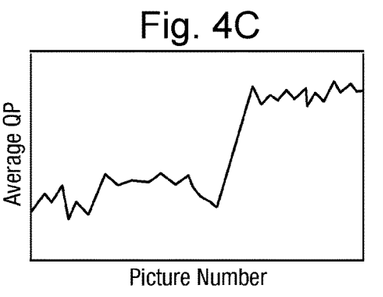

Even a step up as illustrated in FIG. 4C would be apparent to a viewer as a sudden decrease in resolution of spatial detail (a sudden increase in blurriness) in the scene. Such a step-up in QP is more likely to be noticeable if it coincides with an intra-picture.

Figure 4D:
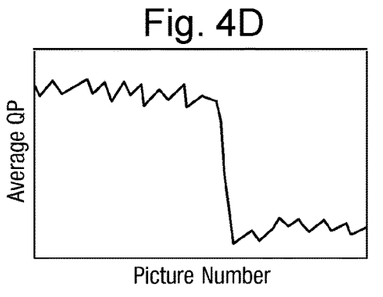

Similarly, a step down as illustrated in FIG. 4D would be apparent to a viewer as a sudden increase in resolution of spatial detail (a sudden decrease in blurriness) in the scene. Such a step-down in QP is more likely to be noticeable if it coincides with an intra-picture.

It has been shown how an intra-picture flicker is detected within a video bitstream without fully decoding the video bitstream. It has also been shown how the general case of a sudden change in QP is detected. This information can be used to improve the accuracy of the quality estimation from a video bitstream quality model.

Figure 5:
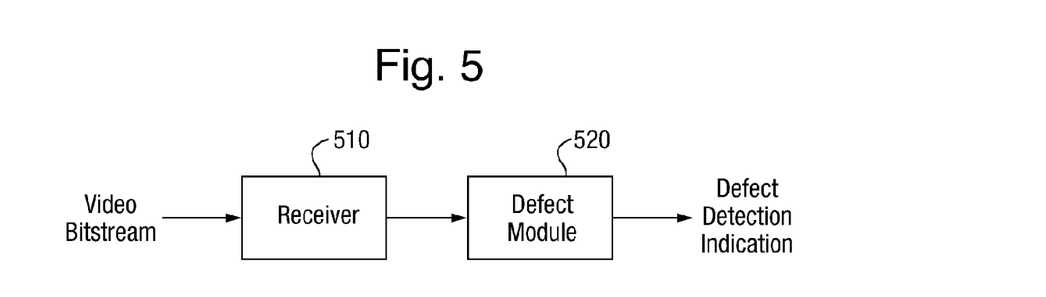
FIG. 5 illustrates an apparatus for performing the method described herein.

FIG. 5 illustrates an apparatus for performing the method described herein. The apparatus comprises a receiver 510, and a defect module 520. The receiver 510 is arranged to receive a video bitstream representing a video sequence. The defect module 520 is arranged to determine a measure of an average quantization parameter for each picture of the video sequence, and to identify a quality defect when an abrupt change in the measure of quantization parameter occurs. When a quality defect is identified by the defect module 520, it outputs a defect detection indication.

Figure 6:
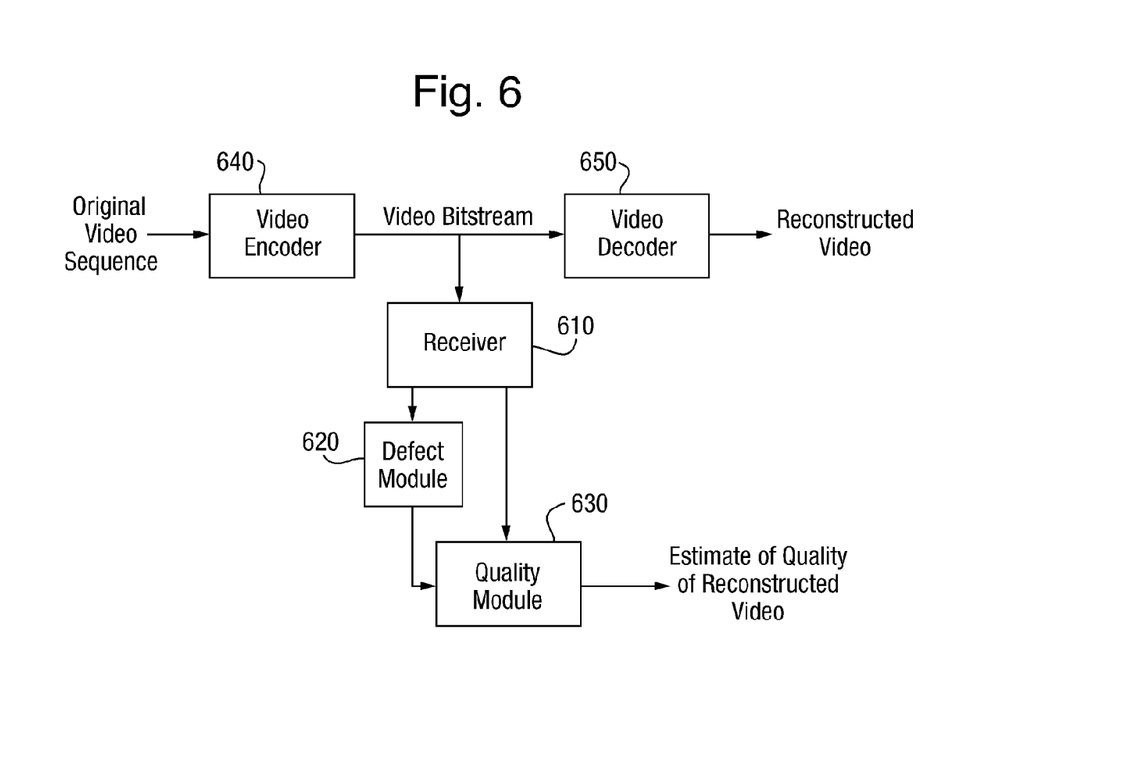
FIG. 6 illustrates an apparatus incorporating the detection of an abrupt change in QP into a quality model.

FIG. 6 illustrates an apparatus incorporating the detection of an abrupt change in QP into a quality model. The apparatus comprises a receiver 610, a defect module 620, and a quality module 630. The receiver 610 is arranged to receive a video bitstream representing a video sequence. The video bitstream is generated by a video encoder 640 by encoding an original video sequence. The video bitstream is also received by a video decoder 650 where the video bitstream is decoded and a reconstructed video sequence is generated. The defect module 620 determines a measure of an average quantization parameter for each picture of the video sequence, and identifies a quality defect when an abrupt change in the measure of quantization parameter occurs. The quality module 630 receives the video bitstream and a defect indication from the defect module 620. The quality module 630 uses these inputs to apply a quality model and to estimate a quality of the video reconstructed from the video bitstream.

A video bitstream quality model may further take into account one or more of the following:
Spatial detail in the scene;
Amount of movement in the scene;
Existence of intra picture flicker;
Number of intra picture flicker occasions;
Frequency of intra picture flicker (per picture or per second);
Distance (in terms of time or number of pictures) between intra picture flicker events;
Difference in QP for intra picture flicker;
Difference in QP for a drop in encoding quality starting at an intra-picture;
Duration of drop in encoding quality starting at an intra-picture;
Difference in QP for a raise in encoding quality starting at an intra-picture;
Duration of raise in encoding quality starting at an intra-picture;
Difference in QP for a QP peak over inter pictures; and
Range of QP for the sequence.

One or more of these details may be included in the calculation of the quality estimation of a video bitstream. How the total quality model is constructed is not in the scope of this document, but it could for instance be a linear model like an additive model or a non-linear model like a multiplicative model.

For example, the spatial detail in the picture may be determined using frequency analysis such as Fourier analysis or a discrete cosine transform. The magnitude and number of high frequency components gives a measure of the spatial detail. Since block-based video codecs transform image and residual data into the frequency domain, it is possible to obtain a measure of the spatial detail of a picture by parsing out from the video bitstream the coefficients relating to the frequency components. Such coefficients are often called AC coefficients. The measure of the spatial detail can be used by a quality model to determine the impact of the quality defect on the quality score. Where the measure of spatial detail is high then the quality defect will have a greater impact on the quality score.

As a further example, a measure of the amount of movement in the picture may be determined by the average magnitude of the motion vectors for macroblocks in the picture. The measure of the amount of movement may be used by a quality model to determine the impact of the quality defect on the quality score. Where the measure of the amount of movement is high then the quality defect will have a lower impact on the quality score.

Figure 7:
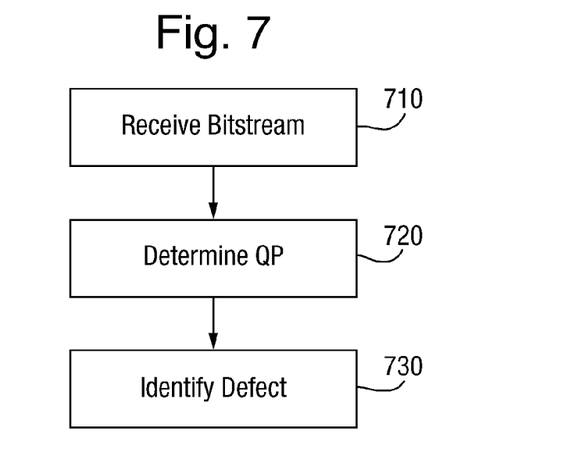
FIG. 7 illustrates a method described herein.

FIG. 7 illustrates a method described herein. At 710, a video bitstream representing a video sequence is received. At 720, a measure of an average quantization parameter for each picture of the video sequence is determined. At 730, a quality defect is identified when an abrupt change in quantization parameter occurs. This quality defect may be used by a quality model to estimate the quality of video reconstructed from the video bitstream.

Figure 8:
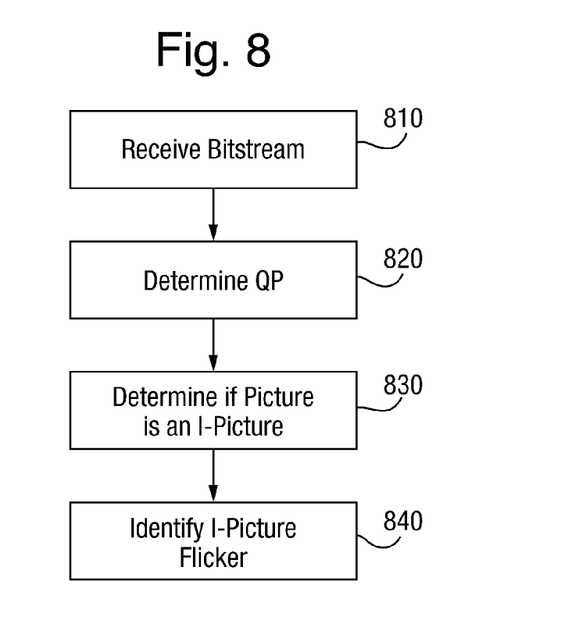
FIG. 8 illustrates another method described herein.

FIG. 8 illustrates another method described herein. At 810, a video bitstream representing a video sequence is received. At 820, a measure of an average quantization parameter for each picture of the video sequence is determined. At 830, it is determined whether each picture is an I-picture. At 840, an intra-picture flicker is identified when the current picture is identified as an I-picture and the quantization parameter for the current picture is both a threshold amount greater than the quantization parameter of the preceding, and the subsequent, picture. The identification of such intra-picture flickering may be used by a quality model to estimate the quality of video reconstructed from the video bitstream.

An advantage of the method and apparatus described herein is that these allow detection of intra-picture flicker and similar quality defects without decoding the bitstream. This means that sudden drops in encoding quality are detected. The estimate of the visual impact of these quality defects can be used to improve the accuracy of the estimated quality from a video bitstream quality model. Further, because the video bitstream quality model does not need to decode the bitstream to determine the quality, video quality monitoring can be performed at parts of the distribution network where decoding the video bitstream would be too costly, in terms of processing resources, power consumption, physical space, etc.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

Further, while examples have been given in the context of particular communications standards, these examples are not intended to be the limit of the communications standards to which the disclosed method and apparatus may be applied. For example, while specific examples have been given in the context of H.264, the principles disclosed herein can also be applied to MPEG-2, H.263, MPEG-4, HEVC/H.265 or other codec, and indeed any video codec using quantization of transform coefficients.

The invention claimed is:

1. A method for obtaining a quality score for a video sequence, the method comprising:
   receiving a video bitstream representing the video sequence comprising a plurality of pictures;
   determining a measure of quantization parameter (QP) for at least three of the plurality of pictures of the video sequence, wherein the determining the measure of QP for at least the three pictures of the video sequence comprises: determining an average QP for a first picture of the video sequence, determining an average QP for a second picture of the video sequence, and determining an average QP for a third picture of the video sequence;
   detecting an abrupt change in the measure of QP, wherein detecting the abrupt change in the measure of QP comprises determining that: a) the average QP for the first picture of the video sequence is greater than the average QP for the second picture of the video sequence by at least a first threshold amount t1 and b) the average QP for the first picture of the video sequence is greater than the average QP for the third picture of the video sequence by at least a second threshold amount t2;
   as a result of detecting the abrupt change, setting an intra picture flicker indicator to indicate that intra picture flicker has been detected;
   determining a QP range for the video sequence, wherein determining the QP range for the video sequence comprises calculating QPmax−QPmin, wherein QPmax is a maximum QP value for the video sequence and QPmin is a minimum QP value for the video sequence; and
   calculating the quality score for the video sequence using the intra picture flicker indicator indicating that intra picture flicker has been identified and the determined QP range.

2. The method of claim 1, further comprising:
   obtaining a motion indication indicative of a motion in the video sequence, wherein
   the quality score for the video sequence is calculated using the quality model, the defect indicator, and the obtained motion indication.

3. The method of claim 2, wherein
   obtaining the motion indication comprises determining an average motion vector, and
   the quality score for the video sequence is calculated using the quality model, the defect indicator, and the average motion vector.

4. The method of claim 1, wherein the video bitstream is encoded using at least one of: H.264, MPEG-2, H.263, MPEG-4 and HEVC/H.265.

5. The method of claim 1, wherein the second picture immediately precedes the first picture in the video sequence and the third picture immediately follows the first picture in the video sequence.

6. The method of claim 5, wherein the first picture is an intra-coded picture and each one of the second and third pictures is an inter-coded picture.

7. The method of claim 1, wherein t1=t2.

8. The method of claim 1, wherein
   the first picture of the video sequence comprises a plurality of blocks, wherein each one of the plurality of blocks of the first picture is associated with a QP value, and
   determining the average QP for the first picture comprises determining the average of said QP values.

9. The method of claim 1, further comprising:
   obtaining a motion indication indicative of a motion in the video sequence; and
   determining a QP range for the video sequence, wherein determining the QP range for the video sequence comprises calculating QPmax−QPmin, wherein QPmax is a maximum QP value for the video sequence and QPmin is a minimum QP value for the video sequence, wherein the quality score for the video sequence is calculated using the quality model, the defect indicator, the obtained motion indication, and the determined QP range.

10. An apparatus for obtaining a quality score for a video sequence represented by a video bitstream, the video sequence comprising a plurality of pictures, the apparatus comprising:
   a receiver for receiving the video bitstream; and
   a data processing unit coupled to the receiver, wherein the apparatus is configured to:
   determine a measure of quantization parameter (QP) for at least three of the plurality of pictures of the video sequence, wherein the determining the measure of QP for at least the three pictures of the video sequence comprises: determining an average QP for a first picture of the video sequence, determining an average QP for a second picture of the video sequence, and determining an average QP for a third picture of the video sequence;
   detect an abrupt change in the measure of QP, wherein detecting the abrupt change in the measure of QP comprises determining that: a) the average QP for the first picture of the video sequence is greater than the average QP for the second picture of the video sequence by at least a first threshold amount t1 and b) the average QP for the first picture of the video sequence is greater than the average QP for the third picture of the video sequence by at least a second threshold amount t2;
   as a result of detecting the abrupt change, set an intra picture flicker indicator to indicate that intra picture flicker has been detected;
   determine a QP range for the video sequence, wherein determining the QP range for the video sequence comprises calculating QPmax−QPmin, wherein QPmax is a maximum QP value for the video sequence and QPmin is a minimum QP value for the video sequence; and calculate the quality score for the video sequence using the intra picture flicker indicator that intra picture flicker has been identified and the determined QP range.

11. The apparatus of claim 10, wherein the apparatus is further configured to obtain a motion indication indicative of a motion in the video sequence, the apparatus is configured to calculate the quality score for the video sequence using the quality model, the defect indicator, and the obtained motion indication.

12. The apparatus of claim 11, wherein the apparatus is configured to obtain the motion indication by determining an average motion vector, and the apparatus is configured to calculate the quality score for the video sequence using the quality model, the defect indicator, and the average motion vector.

13. The apparatus of claim 10, wherein the video bitstream is encoded using at least one of: H.264, MPEG-2, H.263, MPEG-4 and HEVC/H.265.

14. The apparatus of claim 10, wherein the second picture immediately precedes the first picture in the video sequence and the third picture immediately follows the first picture in the video sequence.

15. The apparatus of claim 14, wherein the first picture is an intra-coded picture and each one of the second and third pictures is an inter-coded picture.

16. The apparatus of claim 10, wherein t1=t2.

17. The apparatus of claim 10, wherein the first picture of the video sequence comprises a plurality of blocks, wherein each one of the plurality of blocks of the first picture is associated with a QP value, and the apparatus is configured to determine the average QP for the first picture by determining the average of said QP values.

18. The apparatus of claim 10, wherein the apparatus is further configured to obtain a motion indication indicative of a motion in the video sequence, the apparatus is further configured to determine a QP range for the video sequence, wherein determining the QP range for the video sequence comprises calculating QPmax−QPmin, wherein QPmax is a maximum QP value for the video sequence and QPmin is a minimum QP value for the video sequence, and the apparatus is configured to calculate the quality score for the video sequence using the quality model, the defect indicator, the obtained motion indication, and the determined QP range.

19. A computer program product comprising a non-transitory computer readable medium storing instructions for obtaining a quality score for a video sequence represented by a video bitstream, the video sequence comprising a plurality of pictures, the instructions comprising:

instructions for determining a measure of quantization parameter (QP) for at least three of the plurality of pictures of the video sequence, wherein the determining the measure of QP for at least the three pictures of the video sequence comprises: determining an average QP for a first picture of the video sequence, determining an average QP for a second picture of the video sequence, and determining an average QP for a third picture of the video sequence;

instructions for detecting an abrupt change in the measure of QP, wherein detecting the abrupt change in the measure of QP comprises determining that: a) the average QP for the first picture of the video sequence is greater than the average QP for the second picture of the video sequence by at least a first threshold amount t1 and b) the average QP for the first picture of the video sequence is greater than the average QP for the third picture of the video sequence by at least a second threshold amount t2;

instructions for setting an intra picture flicker indicator to indicate that intra picture flicker has been detected as a result of detecting the abrupt change;

instructions for determining a QP range for the video sequence, wherein determining the QP range for the video sequence comprises calculating QPmax−QPmin, wherein QPmax is a maximum QP value for the video sequence and QPmin is a minimum QP value for the video sequence; and instructions for calculating the quality score for the video sequence using the intra picture flicker indicator indicating that intra picture flicker has been identified and the determined QP range.

20. The computer program product of claim 19, further comprising:

instructions for obtaining a motion indication indicative of a motion in the video sequence, wherein the quality score for the video sequence is calculated using the quality model, the defect indicator, and the obtained motion indication.

21. The computer program product of claim 20, wherein the instructions for obtaining the motion indication comprise instructions for determining an average motion vector, and the quality score for the video sequence is calculated using the quality model, the defect indicator, and the average motion vector.

22. The computer program product of claim 19, wherein the video bitstream is encoded using at least one of: H.264, MPEG-2, H.263, MPEG-4 and HEVC/H.265.

23. The computer program product of claim 19, wherein the second picture immediately precedes the first picture in the video sequence and the third picture immediately follows the first picture in the video sequence.

24. The computer program product of claim 23, wherein the first picture is an intra-coded picture and each one of the second and third pictures is an inter-coded picture.

25. The computer program product of claim 19, wherein t1=t2.

26. The computer program product of claim 19, wherein the first picture of the video sequence comprises a plurality of blocks, wherein each one of the plurality of blocks of the first picture is associated with a QP value, and the instructions for determining the average QP for the first picture comprise instructions for determining the average of said QP values.

27. The computer program product of claim 19, further comprising:

instructions for obtaining a motion indication indicative of a motion in the video sequence; and instructions for determining a QP range for the video sequence, wherein the instructions for determining the QP range for the video sequence comprise instructions for calculating QPmax−QPmin, wherein QPmax is a maximum QP value for the video sequence and QPmin is a minimum QP value for the video sequence, wherein the quality score for the video sequence is calculated using the quality model, the defect indicator, the obtained motion indication, and the determined QP range.

* * * * *